United States Patent [19]

Marx et al.

[11] Patent Number: 5,115,019

[45] Date of Patent: May 19, 1992

[54] CARBOXY-FUNCTIONAL HYDROGENATED BLOCK COPOLYMER DISPERSED IN EPOXY RESIN

[75] Inventors: Edward J. Marx; Michael J. Watkins, both of Houston, Tex.

[73] Assignee: Shell Oil Company, Houston, Tex.

[21] Appl. No.: 503,343

[22] Filed: Mar. 30, 1990

[51] Int. Cl.$^5$ .................. C08G 59/14; G08L 63/02; G08L 63/04
[52] U.S. Cl. ........................ 525/65; 525/934
[58] Field of Search ................... 525/65, 934

[56] References Cited

U.S. PATENT DOCUMENTS

| | | | |
|---|---|---|---|
| 3,477,990 | 11/1969 | Dante et al. | 260/47 |
| 4,119,592 | 10/1978 | Murphy | 525/530 |
| 4,399,241 | 8/1983 | Ting et al. | 523/400 |
| 4,734,468 | 3/1988 | Marx | 525/524 |
| 4,778,851 | 10/1988 | Henton et al. | 525/65 |
| 4,804,581 | 2/1989 | Geary et al. | 428/332 |

FOREIGN PATENT DOCUMENTS

| | | |
|---|---|---|
| 57-149369 | 9/1982 | Japan. |
| 58-17160 | 2/1983 | Japan. |
| 63-308027 | 12/1988 | Japan. |
| 87/00188 | 1/1987 | World Int. Prop. O. . |

*Primary Examiner*—John C. Bleutge
*Assistant Examiner*—Robert E. L. Sellers, II

[57] ABSTRACT

A method for dispersing and stabilizing a carboxy-functionalized butadiene-styrene block copolymer in an epoxy resin is provided comprising the steps of: (a) dispersing from about 5 to about 30 weight percent of a carboxy-functionalized hydrogenated butadiene-styrene block copolymer in a liquid epoxy resin to produce an elastomer-dispersed epoxy resin composition; (b) contacting the elastomer-dispersed epoxy resin composition and from about 15 to about 30 weight percent, based on the weight of the elastomer-modified epoxy resin composition, of a polyhydric phenolic compound in the presence of an advancement catalyst at a temperature within the range of about 40° C. to about 200° C. for time effective for producing a solid elastomer-modified epoxy resin having an epoxy equivalent weight in the range of about 500 to about 1,500; and (c) recovering said solid elastomer-modified epoxy resin. The method provides for impact resistant stable styrene-butadiene block copolymer-modified epoxy resin composition useful for powder coating formulations.

7 Claims, No Drawings

CARBOXY-FUNCTIONAL HYDROGENATED BLOCK COPOLYMER DISPERSED IN EPOXY RESIN

BACKGROUND OF THE INVENTION

This invention relates to curable elastomer-modified epoxy resin compositions and to coatings made from such compositions. In a specific aspect, the invention relates to a method for dispersing an elastomeric block copolymer in an epoxy resin coating formulation.

Rubber-modified epoxy resins are well known. Rubber modification, by blending or co-reacting epoxy resins with elastomeric compounds, is employed to improve such physical properties of epoxy resins as toughness, low profile characteristics, flexibility and adhesion. Rubber-modified epoxy resins are used in formulating corrosion and chip-resistant coatings and impact resistant molding powders.

Powder coatings are used in the automotive industry as primer coatings. Automobile and truck bodies, particularly wheel wells and lower portions of the bodies such as rocker panels, are susceptible to chipping by sand and gravel.

Numerous organic solvent-based coating compositions useful as chip-resistant primers have been proposed as, for example, in U.S. Pat. Nos. 4,581,424, 4,602,053, 4,608,313, and 4,614,683. However, these coating compositions have a high volatile organic compound (VOC) content, which poses a problem for industries attempting to meet governmental guidelines on VOCs.

Chip-resistant powder coatings, which have the advantage of very low VOC, containing carboxy-terminated butadiene acrylonitrile copolymers (CTBN) are known. But, it has been found that the CTBN modifier in the epoxy resin contributes to stability problems and difficulties in processing due in part to its low $T_g$ and its chemical instability.

Carboxy-modified butadiene-styrene block copolymers ("block copolymers") are known to improve the mechanical strength of an epoxy resin composition. Japanese patent applications 58-17160 and 63-308027 disclose that carboxy-modified butadiene-styrene block copolymers give good impact resistance and rigidity in a heat-curable molding composition. However, it has been found that some of the epoxy resins modified with carboxy-modified butadiene-styrene block copolymers phase separate and precipitate upon curing or storage at ambient temperature. In order to obtain a toughened resin composition, the two components need to be incompatible enough to form a dispersed domain of fine rubber particles in the epoxy resin matrix. At the same time, the rubber particles must not precipitate upon storage or curing. CTBN copolymers give some undesirable properties, e.g. stickiness and chemical instability, to the epoxy resins but are relatively compatible and soluble in the resin. Carboxy-modified butadiene-styrene block copolymers are normally incompatible in epoxy resin and readily form precipitates which renders them difficult to handle in a form useful in epoxy coating compositions, as the precipitates tend to form clumps and give an undesirable uneveness to the coated film. It would be desirable to achieve the advantages of the block copolymer modification of an epoxy resin without the dispersion and precipitation disadvantages of such modification.

It is therefore an object of the invention to provide an elastomer-modified epoxy resin composition useful in coating applications. It is a specific object of the invention to provide a block copolymer-modified epoxy resin composition which is stable and readily processible in coating applications.

BRIEF SUMMARY OF THE INVENTION

According to the invention, there is provided a method for dispersing and stabilizing a butadiene-styrene block copolymer in an epoxy resin, comprising the steps of:

(a) dispersing from about 5 to about 30 weight percent of a carboxy-functionalized hydrogenated conjugated diolefin/monoalkenylarene block copolymer in a liquid epoxy resin to produce an elastomer-dispersed epoxy resin composition;

(b) contacting the elastomer-dispersed epoxy resin composition and from about 15 to about 30 weight percent, based on the weight of the elastomer-modified epoxy resin composition, of a polyhydric phenolic compound in the presence of an advancement catalyst at a temperature within the range of about 40° C. to about 200° C. for time effective for producing a solid elastomer-modified epoxy resin having an epoxy equivalent weight in the range of about 500 to about 1,500; and (c) recovering said solid elastomer-modified epoxy resin. Stable and readily processible curable elastomer-modified coating compositions are provided. Stable and readily processible curable elastomer-modified coating compositions are provided.

DETAILED DESCRIPTION OF THE INVENTION

It has been found that stable coating compositions can be prepared from the reaction product of (a) an epoxy resin, (b) a phenolic compound and (c) a modified hydrogenated conjugated diolefin/monoalkenylarene block copolymer, which can be utilized in impact resistant coating formulations.

In general, any selectively hydrogenated block copolymer having at least one polymeric block comprising predominantly monoalkenyl aromatic hydrocarbon monomer units and at least one polymeric block comprising, before hydrogenation, predominantly conjugated diolefin monomer units which has been selectively hydrogenated and modified by incorporating carboxylic acid, carboxylic anhydride derivative functionality or mixtures thereof can be used as the modified hydrogenated block copolymer of this invention. Preferably dicarboxylic acid or carboxylic anhydride is incorporated as the modifier for the hydrogenated block copolymer. The block copolymer may be linear, branched, coupled radial or sequential. Linear block copolymers useful in the epoxy resin composition of this invention include those described in U.S. Pat. Nos. 4,578,429, 3,231,635, 3,265,765 and 3,322,856, which are incorporated herein by reference. In general, linear or branched block copolymers which may be hydrogenated and functionalized and then used in the epoxy resin composition of this invention include those that can be represented by the general formula:

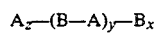

wherein A is a linear or branched polymeric block comprising predominantly monoalkenyl aromatic hydrocarbon monomer units; B is a linear or branched polymeric block containing predominantly conjugated diolefin monomer units; x and z are, independently, 0 or 1; and y is a whole number with the range from 1 to about 20.

Radial block copolymers which may be hydrogenated and functionalized and then used in the epoxy resin composition of this invention also include polymers of the type described in U.S. Pat. Nos. 4,033,888; 4,077,893; 4,391,949 and 4,444,953, which are incorporated herein by reference. Coupled and radial block copolymers which may be hydrogenated and functionalized and then used in the epoxy resin composition of this invention include those that may be represented by the general formula:

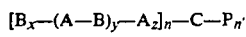
$[B_x-(A-B)_y-A_z]_n-C-P_{n'}$ wherein A, B, x, y and z are as previously defined; n and n' are numbers from 0 to about 100 and n+n'≧3; C is the core of the coupled or radial polymer formed with a polyfunctional coupling agent; and each P is the same or a different polymer block or polymer segment having the general formula:

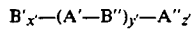
$B'_{x'}-(A'-B'')_{y'}-A''_{z'}$ wherein A" is a polymer block containing predominantly monoalkenyl aromatic hydrocarbon monomer units which may be the same or different from A; B' is a polymer block containing predominantly conjugated diolefin monomer units which may be the same or different from B; A'—B" is a polymer block containing monoalkenyl aromatic hydrocarbon monomer units (A') and conjugated diolefin monomer units (B"), the A'—B" monomer units may be random, tapered or block and when each of A' and B" is blocked, the A' block may be the same or different from A" and B" may be the same or different from B'; x' and z' are, independently, 0 or 1; and y' is a number from 0 to about 20, and the sum of x' plus y' plus z' is greater than or equal to 1.

The coupled and radial polymer may be symmetric or asymmetric. For convenience, the linear, branched, coupled or radial polymers useful in this invention composition, which may be hydrogenated and functionalized, will be referred to as base block copolymers.

The base block copolymers of conjugated dienes and alkenyl aromatic compounds which may be utilized in this invention include any of those materials which have 1,2-microstructure contents in the conjugated diolefin block prior to hydrogenation of from about 7% to about 100%, preferably from about 25 to about 65%, more preferably 35 to 55 %. The proportion of the alkenyl aromatic blocks in these block copolymers is between preferably about 2 and about 65 percent, and more preferably between about 5 and about 40 percent by weight.

The number average molecular weights of the individual blocks may vary within certain limits. The monoalkenyl aromatic blocks will have average molecular weights in the order of about 1,000 to about 125,000, preferably about 2,000 to about 60,000 and most preferably between about 4,000 and about 25,000. The conjugated diolefin blocks either before or after hydrogenation will have average molecular weights in the order of about 10,000 to about 450,000, preferably about 15,000 to about 150,000 and most preferably between about 20,000 and 100,000.

The method of hydrogenation of the base block copolymer is not critical and may be accomplished in a variety of methods of hydrogenating diene polymers. Preferably, the base block copolymers are hydrogenated using methods such as those taught in U.S. Pat. Nos. 3,494,942, 3,634,594, 3,670,054, 3,700,633 and Re 27,145, for example. Preferably, the hydrogenation will be accomplished using one of the methods taught in U.S. Pat. No. 3,700,633.

Hydrogenation preferably reduces the ethylenic unsaturation of the base polymer to less than 20% of the original ethylenic unsaturation, more preferably reduced to less than 10% and most preferably to less than 5%. Aromatic unsaturation is preferably reduced by less than 20% by the selective hydrogenation of the base block copolymer, and is more preferably reduced by less than 10%.

Hydrogenated or selectively hydrogenated conjugated diolefin polymers containing residual ethylenic unsaturation may be modified with a carboxylic acid or carboxylic acid derivative simply by heating the polymer in the presence of an ethylenically unsaturated carboxylic acid or carboxylic acid derivative. The carboxylic acid or carboxylic acid derivative may be monofunctional, such as acrylic, methacrylic, cinnamic, crotomic, isocrotonic, mesaconic, methylmesaconic and the like, or polyfunctional, particularly difunctional, such as maleic, fumaric, itaconic, citraconic and the like. Thermal functionalization is taught, for example, in U.S. Pat. Nos. 4,292,414 and 4,308,353. With this process, incorporation of isolated carboxylic acid groups or in some cases a chain thereof onto the polymer backbone is possible. Free radicals may be generated in the thermal addition reactions. Hydrogenated or selectively hydrogenated conjugated diolefin polymers which may or may not contain residual ethylenic unsaturation may be carboxylated by free radical grafting of an unsaturated acid or anhydride onto the polymer at an elevated temperature in the presence of a free-radical initiator. Grafting via a free radical mechanism is taught, for example, in U.S. Pat. No. 4,589,429. Incorporation of the carboxylic acid group or groups via this technique may result in cleavage of the polymer backbone with the carboxyl group or groups being incorporated at the end of one or both of the cleaved segments.

Functionalized hydrogenated block copolymers useful in the invention epoxy resin compositions will contain from about 0.01 to about 20 weight percent of functional groups as —COOH based on the weight of the modified block copolymer. More preferably, they contain from about 0.1 weight percent to about 5 weight percent, most preferably from about 0.5 to about 3.0 weight percent of functional groups. The terms "carboxy-functionalized" or "carboxylated" can be block copolymers with carboxyl groups grafted or with anhydride groups grafted and subsequently hydrolyzed.

Any of the methods described above can be used to effect functionalization of the block copolymer, when residual unsaturation is present in the conjugated diolefin polymer. Functionalization of the polymer via grafting through a free radical mechanism such as that taught in U.S. Pat. No. 4,578,429 is preferred. If functionalization is completed by this preferred method, residual ethylenic unsaturation in the conjugated diolefin frequently will be minimal. Commercial examples of preferable functionalized elastomeric polymers include KRATON® FG1901 anhydride-functionalized linear thermoplastic elastomer manufactured by Shell Chemical Company.

Epoxy resins suitable for the invention composition are generally any liquid epoxy resins, provided that they can be advanced to a solid state with, for example, bisphenol-A. The epoxy resin preferably has an average weight per epoxide (WPE) within the range of about 175 to about 350 and a number average molecular weight within the range of about 340 to about 600. Higher WPE's and molecular weights may be used, provided that the resin is liquid or in solution at the processing temperature and processable in a high shear mixer or a melt blender.

Generally the epoxy resin will have a 1,2-epoxy equivalency greater than one and preferably about two or more. The epoxy resin may be saturated or unsaturated, aliphatic, cycloaliphatic, aromatic or heterocyclic. Examples of epoxy resins suitable for use in the invention include polyglycidyl ethers of polyhydric compounds, brominated epoxies, epoxy novolacs or similar polyhydroxyphenol resins, polyglycidyl ethers of glycols or polyglycols, and polyglycidyl esters of polycarboxylic acids. Preferably the epoxy resin is a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxytert-butylphenyl) propane; 1,1-bis(4-hydroxyphenyl) ethane; 1,1-bis(4-hydroxyphenyl) isobutane; 2,2-bis(4-hydroxytertiarybutylphenyl) propane; bis(2-hydroxynapthyl)methane; 1,5-dihydroxynaphthalene; 1,1-bis(4-hydroxy-3-alkylphenyl)ethane and the like. The preferred polyhydric phenol is bisphenol-A. Commercial examples of suitable epoxy resins include advanced EPON ® Resin 828, a product of Shell Chemical Company which is a diglycidyl ether of 2,2-bis(4-hydroxyphenyl)propane having an average molecular weight of 380 and a weight per epoxy in the range of about 180 to about 195.

The epoxy resin is modified according to the invention process by dispersing and subsequently advancing with about 5 to about 25 weight percent of the functionalized elastomeric polymer described above. The modification of the epoxy resin is generally a catalyzed addition reaction between the functional groups of the elastomeric material and the oxirane groups of the epoxy. It is not necessary to complete reaction between the block copolymer functionality and epoxy groups. The reaction can be conducted in a suitable solvent with the product subsequently isolated for powder coating usage. For a stable modified epoxy resin composition useful for coating formulations, the functionalized block copolymer is dispersed in a liquid epoxy resin and is then advanced. For example, the carboxy(CFBS) described above can be first dispersed in EPON ® Resin 828 and then advanced with bisphenol-A (BPA).

Suitable dispersions of the modified block copolymer in epoxy resin for subsequent advancement can be prepared by melt blending CFBS into the epoxy resin in a solvent-free process using a high shear mixer or in a solution process. In a solvent-free process, mixing times and temperatures will depend on the particular epoxy resin and on the equipment used. Blending for greater than about 15 minutes at a temperature of greater than about 150° C. is preferred. Any high mechanical energy mixing device can be used. For higher molecular weight block copolymers, and for higher viscosity epoxy resins, a heavy duty high shear mixer such as, for example, a mill, kneader or extruder will be required to disperse the block copolymer for high concentrations of block copolymer. The severity of high shear mixing is related to the particle size of CFBS formed in the epoxy composition. High shear mixing sufficiently severe to form dispersed modified block copolymer particles of 10 microns or less in number average particle diameter is preferred, and high shear mixing sufficiently severe to form dispersed modified block copolymer particles of 2 microns or less is most preferred.

The elastomer-modified epoxy resin composition of this invention is preferably prepared by solution blending, for ease of handling and use of conventional agitation devices. The modified block copolymer will precipitate from solution when epoxy resin is added to a solution of the block copolymer, forming a dispersion. This dispersion must be held under high shear mixing and heated to a temperature sufficiently high to accomplish the reaction between the modified block copolymer and the epoxy resin. It is preferable that reaction between the epoxy and the carboxyl functionality be minimal until the desired particle size of the modified block copolymer in the epoxy resin is achieved. In order to increase the chemical reaction rate of the epoxy and the carboxyl groups, if desired, the dispersion mixture can include a small amount of catalyst. Suitable catalysts include tertiary amine catalysts such as tributylamine, quaternary ammonium salts such as tetrabutylammonium chloride, tertiary phosphates such as triphenylphosphate, quaternary phosphonium salts such as ethyltriphenyl phosphonium iodide, metal salts such as AMC-2 (a chromium octoate salt), and combinations of catalysts in staged reactions, with the quaternary phosphonium salts such as ethyltriphenyl phosphonium iodide being preferred. The catalyst, when used, is preferably present in the composition in amounts from 0 to about 5 weight percent, preferably from about 0.2 to 2 percent by weight based on total weight of the epoxy resin composition.

The advancement reaction is typically carried out by combining the block copolymer-dispersed epoxy resin prepared as described above and a polyhydric phenol at a starting temperature of about 100° to 120° C., adding the advancement catalyst, and allowing the reaction to exotherm to a temperature of about 160° to 200° C., for a time effective for producing an advanced elastomer-modified epoxy resin having an epoxy equivalent weight in the range of about 500 to about 1,500, preferably in the range of about 700 to about 1,200, which will generally require about 1 to 2 hours. The reaction temperature and reaction time for the advancement of the modified epoxy resin and a polyhydric phenol will generally depend upon the catalyst selected, but will generally be conducted at a temperature within the range of about 40° C. to about 200° C. for a reaction time of about 0.5 to about 5 hours. Dihydric phenols are preferred for advancement reactions. Preferably from about 15 to about 30 weight percent of dihydric phenol, based on the epoxy resin composition, is added. A catalyst for the advancement is added to the reaction in amounts of about 0.001 to about 2.0 weight percent, preferably from about 0.01 to about 0.4 weight percent, based on the total weight of the reaction mixture. Suitable advancement catalysts include tertiary amine catalysts such as tributylamine, quaternary ammonium salts such as tetrabutylammonium chloride, tertiary phosphates such as triphenylphosphate, quaternary phosphonium salts such as ethyltriphenyl phosphonium iodide, and combinations of catalysts in staged reactions, with the quaternary phosphonium salts such as ethyltriphenyl phosphonium iodide being preferred. The advancement reaction may be carried out in the presence or absence of solvents or diluents such as xylene, toluene or cyclohexane. Generally, the reactants will be liquid at the reaction temperature and the reaction can be carried out without the addition of solvents of diluents. It is theorized that the block copolymer particles become stabilized when the resin is advanced by trapping the dispersed block copolymer in a matrix of epoxy resin before it can aggregate. The reaction product upon cooling is a friable solid.

Phenolic compounds suitable for advancement reactions are polyhydric phenols. Suitable polyhydric phenols are dihydric phenols which are phenols having two hydroxyl groups attached to an aromatic or polyaromatic nucleus, such as, for example, resorcinol, catechol, 2,2-bis(4-hydroxyphenyl)propane, 4,4'-sulfonyldiphenol and dihydroxy diphenyl methane. Preferred dihydric phenols are bis(hydroxyphenyl)alkanes, such as, for example, 2,2-bis(4-hydroxyphenyl) propane; 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiarybutylphenyl) propane; bis(2-hydroxynapthyl) methane; 1,5-dihydroxynaphthalene; 1,1-bis(4-hydroxy- 3-alkylphenyl) ethane and the like.

Further, it has been found that curable elastomer-modified epoxy resin compositions comprising (a) the advanced elastomer-modified epoxy resin described above and (b) a curing agent for the epoxy resin, can be used in corrosion and chip-resistant coating formulations. Curing agents suitable for use with the advanced elastomer-modified epoxy resin composition are generally any known curing agents for epoxy resin. Suitable curing agents include, for example, acid functionalized polyesters, polyamines, dicyandiamide types (e.g. dicyandiamide and accelerated dicyandiamide), imidazoles, polycarboxylic acids and phenolics. The amount of (a) to (b) will generally be within plus or minus about 20 percent of the stoichiometric amount. The ratio may be adjusted to compensate for the type of catalyst, cure conditions, and desired coating properties. Ratios outside the range can lead to low molecular weight crosslinked products with less than optimum properties.

The invention elastomer-modified epoxy resin composition can be used in neat applications such as in powder coatings application described below or in solution applications such as in liquid coating applications. The invention elastomer-modified epoxy resin composition is particularly useful in powder coatings application. Liquid coatings can be applied by conventional coating methods, such as dipping, spraying or electrodeposition, and can be useful in industrial coatings application. Liquid coatings can be particularly useful, for example, as ambient cure coating for marine and maintenance and baked coating for various industrial applications.

The invention elastomer-modified epoxy resins may include additives such as catalysts, pigments, fillers, light stabilizers and antioxidants. When the elastomer-modified epoxy resin is applied in a powder coating composition, such conventional powder coating additives as flow control agents, anti-popping agents, and powder flow materials may also be included.

The invention elastomer-modified epoxy containing coating compositions may include a small percentage of catalysts in order to increase the crosslinking rate of such coating compositions. Baking temperatures will ordinarily be within the range of about 120° C. to 204° C. Suitable catalysts are quaternary ammonium salts, quaternary phosphonium salts, phosphines, and imidazoles. Examples include tetrabutylammonium chloride, tetrabutylammonium bromide or tetrabutylammonium iodide, ethyltriphenyl phosphonium acetate, triphenylphosphine, and 2-methylimidazole. The catalyst, when used, is preferably present in the composition in amounts from 0 to about 5 weight percent, preferably from about 0.2 to 2 percent by weight based on total weight of the coating composition.

In accordance with the powder coating embodiment of the present invention, thermosetting chip-resistant powder coating compositions are prepared by melt blending the ingredients of the coating compositions. This can be accomplished by first dry blending the ingredients in a planetary mixer and then melt blending the admixture in an extruder at a temperature within the range of about 80° C. to 130° C. The extrudate is then cooled and pulverized into a particulate blend.

The thermosetting chip-resistant powder coating composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of about 2.0 to about 15.0 mils.

The substrate can optionally be preheated prior to application of a powder coating composition to promote uniform and thicker powder deposition. After application of the coating powder, the powder-coated substrate is baked, typically at about 250° F. to about 400° F. (120° C. to 204° C.) from about 1 minute to 60 minutes, preferably at about 300° F. to about 400° F. from about 10 minutes to about 30 minutes.

The powder coating compositions can be applied directly upon bare metal, e.g., upon untreated, unprimed steel, or upon pretreated, i.e., phosphatized, unprimed steel. The powder coating compositions can also be applied upon phosphatized steel having a thin (0.8 mils to 2 mils) layer of an electrodeposited primer, cured or uncured before the application of the powder coating composition. The electrodeposited primer coating upon the metal substrate can be, for example, a cathodic electrodeposition primer composition such as UNIPRIME ® 3150 primer available from PPG Industries, Inc. In one aspect of the present invention, it is contemplated that the powder coating composition can be applied directly upon an uncured electro-deposited primer coating and the powder coating layer can be co-cured by heating at temperatures between 300° F. and 350° F. for from about 10 minutes to about 30 minutes.

The powder coating compositions of this invention exhibit improved stability and processability compared to conventional powder coating compositions that are modified with CTBN. They are less sticky, resulting in easier handling, and do not have the tendency of premature gelling. In addition, coatings prepared from the powder coating compositions of the invention exibit less yellowing.

After application and curing of the elastomer-modified powder coating composition, at least one topcoat layer can be applied over the chip resistant coating layer. The topcoat can be, for example, a polyester-based coating, an acrylic-based coating, an acrylic-based coating and an acrylic and polyester containing coating, cured with a melamine resin or isocyante or an epoxy-based coating such as a glycidyl acrylate coating. It can also be aliphatic epoxy cured with amine for weatherable coating. The topcoat may be solvent-based, solventless, water-based or powder coating. The elastomer-modified epoxy containing coating layers have excellent intercoat adhesion to such topcoats, as well as to an electrodeposited primer coating layer, thereby providing excellent chip resistance to the entire composite coating upon the metal substrate.

The invention composition provides coating formulations with stable rubber phase during cure and storage conditions. It can be used in automotive applications to provide desired anti-chip protection. For example, an automotive coating including an electrodeposited primer layer, a layer containing the elastomer-modified epoxy, and a topcoat layer can be used on those portions of a car susceptible to stone chipping. Similarly, a coating including an electrodeposited primer layer and a layer containing the elastomer-modified epoxy can be used as underbody coatings in areas which are generally not topcoated. The coated articles of the present invention can maintain chip resistance, corrosion resistance, and excellent intercoat adhesion throughout the temperature range, i.e., from about −10° F. to 100° F., and corrosive environments normally encountered annually by automotive vehicles. In addition, embodiments including the layer containing the elastomer-modified epoxy upon the metal substrate with or without a topcoat layer thereon may be used in environments which are not typically as corrosive as automotive applications, e.g., appliance coatings, yet still provide chip resistance and excellent intercoat adhesion.

EXAMPLE 1

Table 1 below describes a carboxylated butadiene-styrene block copolymer (CFBS) modified epoxy resin composition and comparative examples without a modifier and with a carboxy-terminated butadiene acrylonitrile (CTBN) modifier.

A CFBS-modified solid epoxy resin, identified as resin 1 in Table 1, was prepared using the following procedure: The CFBS block copolymer used was a polystyrene-hydrogenated polybutadiene-polystyrene block copolymer of about 50,000 molecular weight and 30% w styrene content which after selective hydrogenation had been extruder grafted with maleic anhydride in the presence of peroxide. The maleic anhydride level is 1.9% w bound. 50 grams of the block copolymer, 40 grams of SHELL SOL ® B fast evaporating hydrocarbon solvent available from Shell Chemical Co., 120 grams of methyl ethyl ketone and 40 grams of EPON ® Resin 828 were placed into a 1000 ml beaker. A Silverson high speed disperser was used to dissolve all the ingredients and raise their temperature to 60° C. With continued dispersion, 410 grams of EPON ® Resin 828, which had been preheated to 60° C., was added to the mixture and brought to 190° C. over a period of 1.5 hours. Almost all of the solvent was allowed to evaporate during this operation. After holding the blend for an additional 15 minutes at 190° C., it was cooled to 130° C. under mild agitation prior to addition of 165.3 grams of bisphenol-A (BPA), and 0.4 grams of ethyl triphenyl phosphonium iodide (ETPPI). Under high speed dispersion, the mixture was brought to 170° C. and held for 1.5 hours. During this hold, any remaining solvent was removed. The resulting 665 grams of molten resin was then solidified by cooling in aluminum pans.

An unmodified solid epoxy resin, identified as STD in Table 1, was prepared as follows: 1442 grams of EPON ® Resin 828 and 558 grams of BPA were placed in a two liter glass resin kettle. The kettle was fitted with a lid containing four openings for a stirrer, condenser, sparge tube and temperature indicator. An electric heating mantle surrounding the resin kettle was used to raise the temperature of the mixture to 90° C. in one hour. 0.12 grams of ETPPI catalyst was then added and the mixture was raised to 160° C. in 30 minutes, allowed to exotherm and held at 170° C. for 3.5 hours. The product was poured into aluminum pans to cool and solidify.

CTBN modified solid epoxy resins, identified as A and B in Table 1, were prepared as follows: For A, 651.5 grams of EPON ® Resin 828, 248.5 grams of BPA and 100.0 grams of CTBN 1300X8 (available from B. F. Goodrich Co. as Hycar ® polymer) were placed in a two liter glass resin kettle. In an apparatus identical to the above STD resin, 0.3 grams of ETPPI and 0.6 grams of IRGANOX ® 1010 (an antioxidant available from Ciba-Geigy) were added after heating the initial mixture to 90° C. over an hour period. The mixture was then raised to 160° C. in 30 minutes, allowed to exotherm and held at 170° C. for 3.5 hours. The product was poured into aluminum pans to cool and solidify. Example B was prepared similarly except 584.6 grams of EPON ® Resin 828, 215.6 grams of BPA and 200 grams of CTBN 1300X8 were added.

Properties of these elastomer-modified epoxy resin compositions are shown in Table 1 below.

TABLE 1

|  | STD | A | B | 1 |
|---|---|---|---|---|
| Composition |  |  |  |  |
| CTBN 1300X8 (percent) | 0 | 10 | 20 | 0 |
| CFBS Block Copolymer | 0 | 0 | 0 | 7.51 |
| Bisphenol-A | 27.9 | 24.85 | 21.54 | 24.85 |
| EPON ® Resin 828 | 72.1 | 65.15 | 58.46 | 67.64 |
| ETPPI | (0.06) | (0.03) | (0.03) | (0.06) |
| IRGANOX ® 1010 | — | (0.06) | (0.06) | — |
| Properties |  |  |  |  |
| Epoxy Equivalent Weight |  |  |  |  |
| Calculated | 720 | 809 | 893 | 725 |
| Measured | 725 | 812 | 1075 | 763 |
| Solution Viscosity, (40% Wt. in MEK), cP | 13.4 | 27.1 | — | 17.4 |
| Melt Viscosity, poise @ 150 C. | 27 | 53 | 160 | 41 |
| Glass Transition Point, DSC, Midpoint, °C. | 58 | 47 | 58 | 56 |
| Mettler Melt Point, °C. | 89 | 96 | 95 | 93 |

The CFBS-modified epoxy resin composition is a stable solid without any visual degradation, separation or precipitation of the elastomer upon storage. We have found that it is not necessary to use antioxidants like IRGANOX 1010 for such a CFBS-modified epoxy resin composition.

EXAMPLE 2

Table 2 below describes powder coating compositions made from epoxy resin compositions as described in Example 1. The ingredients listed in Table 2 were each blended in a planetary mixer for about 2 to 3 minutes, then melt blended through a Buss PR-46 extruder. The extrudates were cooled on a chill roll, broken into chunks, and ground in a hammer mill to a fine powder.

The powders were then sieved through a 100 mesh screen to remove any oversized particles.

The resultant powder coating compositions were electrostatically sprayed onto grounded steel panels using an electrostatic spray gun. A layer of about 2 mils ultimate thickness was applied and cured for 10 minutes in a 400° F. oven. The performance of these elastomer-modified powder coatings are shown in Table 2 below.

As can be seen from the performance data, inclusion of CFBS did not substantially lower the gel time of the powder coating composition compared to the CTBN-containing powder coating composition. This suggests the chemical stability of the CFBS-modified epoxy resin, which appears to have minimal side reactions thus avoiding premature gellation. In addition, marginally less yellowing of the CFBS modified powder coated article is evidenced by the lower yellow value in the performance. Because of the higher Tg and lack of stickiness of the CFBS modified epoxy resin, the powder was physically more stable and easier to handle and to process. The higher Tg value of the cured powder is expected to give better temperature resistance without loss in toughness. A stable coating formulation is obtained, as evidenced by lack of large lumps and uneveness in the coating.

TABLE 2

Elastomer Modified Powder Coatings Compositions

| | STD | A | 1 |
|---|---|---|---|
| | Example | | |
| EPON ® Resin 2002** (grams) | 554 | 304 | — |
| EPON ® Resin 2002-FC-10** | 65 | 65 | 65 |
| CTBN modified epoxy resin[1] | — | 250 | — |
| CFBS modified epoxy resin[2] | — | — | 554 |
| EPON ® Curing Agent P-108* | 31 | 31 | 31 |
| TiO$_2$ | 350 | 350 | 350 |
| | Performance | | |
| Gel Time, sec. @ | | | |
| 176° C. | 168 | 36 | 151 |
| 202° C. | 67 | 20 | 63 |
| % Gloss @ | | | |
| 20° C. | 94 | 88 | 77 |
| 60° C. | 99 | 94 | 82 |
| Color: | | | |
| L (Whiteness) | 92.5 | 92.5 | 91.9 |
| a (Red/Green, +/−) | −1.1 | −1.1 | −1.1 |
| b (Yellow/Blue, +/−) | 1.0 | 2.9 | 2.4 |
| MEK Resistance | All passed 100 double rubs | | |
| Pencil Hardness | All gave scratch hardness values of 7H | | |
| Appearance, Smoothness, (1-5, best-worst) | 1-2 | 4 | 4-5 |
| Inclined Plate Flow: | | | |
| 10 Min. @ 400 F., mm | 65 | 43 | 32 |
| 20 Min. @ 350 F., mm | 85 | 56 | 40 |
| Impact, In. Lb: | | | |
| a) Direct | P160 | P160 | P160 |
| Reverse | P160 | P160 | P160 |
| b) Direct | P160 | P160 | P160 |
| Reverse | P160 | P160 | P160 |
| Glass Transition Point, DSC, Midpoint, °C. | | | |
| Powder | 61.6 | 65.5 | 66.2 |
| Cured Powder | 107.6 | 103.4 | 108.6 |

*Accelerated dicyandiamide curing agent available from Shell Chemical Company.
**Solid powder coating resins, produced from advancement of a liquid epoxy resin and BPA available from Shell Chemical Company. FC-10 contains 10% polyacrylate flow control agent.
[1]Composition B of Table 1.
[2]Composition 1 of Table 1.
a) Applied 2 mils films on type-S Q panels and cured for 10 minutes at 400 F.
b) Applied 2 mils films and cured 10 minutes at 350 F.

We claim:

1. A process for preparing an elastomer-modified epoxy resin composition comprising the steps of:
   (a) dispersing from about 5 to about 30 weight percent based on unmodified epoxy resin of a carboxy-functionalized hydrogenated conjugated diolefin/monoalkenylarene block copolymer in a liquid epoxy resin to produce an elastomer-dispersed epoxy resin composition;
   (b) contacting the elastomer-dispersed epoxy resin composition and from about 15 to about 30 weight percent, based on the weight of the elastomer-modified epoxy resin composition, of a polyhydric phenolic compound in the presence of an advancement catalyst at a temperature within the range of about 40° C. to about 200° C. for time effective for producing a solid elastomer-modified epoxy resin having an epoxy equivalent weight in the range of about 500 to about 1,500; and
   (c) recovering said solid elastomer-modified epoxy resin.

2. The process of claim 1 wherein the phenolic compound is a dihydric phenol.

3. The process of claim 2 wherein the phenolic compound is bisphenol-A.

4. The process of claim 1 wherein the epoxy resin is a glycidyl ether of a bisphenol.

5. The process of claim 2 wherein the carboxy-functionalized hydrogenated conjugated diolefin/monoalkenylarene block copolymer comprises a carboxylated base block copolymer of the formula:

$$A_z\text{—}(B\text{—}A)_y\text{—}B_x$$

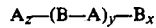

wherein A is a linear or branched polymeric block comprising predominantly monoalkenyl aromatic hydrocarbon monomer units; B is a linear or branched polymeric block containing predominantly conjugated diolefin monomer units; x and z are, independently, to 0 or 1; and y is a whole number ranging from 1 to about 20.

6. The process of claim 2 wherein the carboxy-functionalized hydrogenated conjugated diolefin/monoalkenylarene block copolymer comprises a carboxylated base block copolymer of the formula:

$$[B_x\text{—}(A\text{—}B)_y\text{—}A_z]_n\text{—}C\text{—}P_{n'}$$

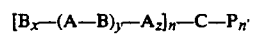

wherein A is a linear or branched polymeric block comprising predominantly monoalkenyl aromatic hydrocarbon monomer units; B is a linear or branched polymeric block containing predominantly conjugated diolefin monomer units; x and z are, independently, 0 or 1; y is a whole number ranging from 1 to about 20; n and n' are numbers from 0 to about 100 and n+n'≧3; C is the core of a coupled or radial polymer formed with a polyfunctional coupling agent; and each P is the same or a different polymer block or polymer segment having the general formula:

$$B'_{x'}\text{—}(A'\text{—}B'')_y\text{—}A''_{z'}$$

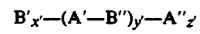

wherein A" is a polymer block containing predominantly monoalkenyl aromatic hydrocarbon monomer units which may be the same or different from A; B' is a polymer block containing predominantly conjugated diolefin monomer units which may be the same or different from B; A'—B" is a polymer block containing monoalkenyl aromatic hydrocarbon monomer unites A' and conjugated diolefin monomer units B", the A'—B"

monomer units may be random, tapered or block and when each of A' and B" is block, the A' block may be the same or different from A" and B" may be the same or different from B'; x' and z' are, independently, numbers equal to 0 or 1; and y' is a number from 0 to about 20, and the sum of x' plus y' plus z' is greater than or equal to 1.

7. The process of claim 1 in which the carboxy-functionalized hydrogenated conjugated diolefin/monoalkenylarene block copolymer is a carboxy-functionalized hydrogenated butadiene-styrene block copolymer and is dispersed in the liquid epoxy resin by high shear mixing at a temperature greater than about 150° C.

* * * * *